United States Patent [19]

Yoneda et al.

[11] Patent Number: 5,081,955
[45] Date of Patent: Jan. 21, 1992

[54] ANIMAL EXPERIMENT APPARATUS

[75] Inventors: Ryozo Yoneda; Hiroyuki Ohara, both of Kato; Shinji Ohtsuka, Ichikawa, all of Japan

[73] Assignee: Nippon Zoki Pharmaceutical Co., Ltd., Osaka, Japan

[21] Appl. No.: 619,676

[22] Filed: Nov. 29, 1990

Related U.S. Application Data

[63] Continuation of Ser. No. 343,688, Apr. 27, 1989, abandoned.

[30] Foreign Application Priority Data

Apr. 30, 1988 [JP] Japan .................... 63-107956

[51] Int. Cl.$^5$ .................... A01K 1/03
[52] U.S. Cl. .................... 119/15; 119/17
[58] Field of Search .................... 119/15, 17, 19, 37, 119/39, 35, 174

[56] References Cited

U.S. PATENT DOCUMENTS

| | | | |
|---|---|---|---|
| 3,237,599 | 3/1966 | Torrey et al. | 119/37 |
| 3,302,615 | 2/1967 | Tietje | 119/15 |
| 3,557,756 | 1/1971 | Ramsey | 119/17 |
| 3,584,927 | 6/1971 | Ott | 119/37 |
| 3,630,174 | 12/1971 | Runkle | 119/15 |
| 3,830,201 | 8/1974 | Coulbourn | 119/17 |
| 3,923,006 | 12/1975 | Dugan et al. | 119/37 |
| 4,526,133 | 7/1985 | LoMaglio | 119/17 |
| 4,798,171 | 1/1989 | Peters et al. | 119/15 |

*Primary Examiner*—John G. Weiss
*Attorney, Agent, or Firm*—Oliff & Berridge

[57] ABSTRACT

An animal experiment apparatus is disclosed. Heated air or cooled air introduced into an air fan chamber provided in a housing is circulated in the housing by an air fan. The housing is vertically divided into a plurality of chambers by reticulate partition shelves and a cage containing a small animal is put into and out of each chamber. The housing is provided with a commutator plate for controlling the circulating air and/or a temperature detector, a humidity detector, a control unit for controlling the housing in accordance with signals from the detectors, and a brightness-controlling device.

11 Claims, 6 Drawing Sheets

ANIMAL EXPERIMENT APPARATUS

This is a continuation of application Ser. No. 07/343,688 filed Apr. 27, 1989 now abandoned.

DETAILED DESCRIPTION OF THE INVENTION

1. Field of the Invention

The present invention relates to an animal experiment apparatus for subjecting small animals such as mice, rats and guinea pigs to an environmental change such as a change in light and a change in temperature.

2. Description of the Prior Art

Experiments of imposing a stress on small animals at a low temperature or a high temperature by subjecting them to a specific fluctuation of ambient temperature rhythm, for example, by varying the ambient temperature every hour, have been carried out. An apparatus used for such an experiment generally has the following structure.

A housing which is provided with doors at the front surface thereof is vertically partitioned into a plurality of chambers by latticed shelves. A fluorescent lamp is provided on the ceiling or the side wall above each of the doors of the housing, and an air fan is provided on the ceiling. The temperature of the housing is regulated to a low temperature or a high temperature by a cooler or a heater. Plastic cages containing small animals are placed on the shelves.

In order to control the ambient temperature of the small animals in such an apparatus, the temperature is lowered by the cooler and raised by the heater. In order to provide a specific fluctuation of the ambient temperature, the doors of the cooled or heated housing are left open and the cages are put into and out of the housing.

In such an apparatus for imposing stress on small animals, it is especially important for heightening the reliability of various kinds of experiments using small animals that all the animals contained in the housing are subjected to the same environment. In the conventional apparatus such as that described above, however, since the fluorescent light is only provided on the ceiling or the side wall above each of the doors of the housing, the chambers in the lower part are inconveniently darker than the chambers in the upper part because the distance from the light source is large and the light is shaded by the cages placed on the higher shelves.

In addition, since the air driven from the air fan is diffused immediately after passing through the cooler or the heater, cold or hot air flows at a high rate to the cages in the vicinity of the cooler or the heater. In other words, the environmental conditions are different between the cages in the vicinity of the cooler or the heater and the cages distant therefrom.

The conventional apparatus described above is only capable of either a low-temperature stress test or a high-temperature stress test. In order to fluctuate a temperature rhythm, the temperature of the housing can be either lowered or raised by the cooler or the heater provided therein, but the opposite temperature change must be given by keeping the doors open. Therefore, whenever it is necessary to lower or raise the temperature, the doors are opened by hand and the cages are carried out, thereby lowering the workability.

Since either of the upper limit or the lower limit of the ambient temperature of small animals in the fluctuation of the temperature rhythm depends upon room temperature, it is impossible to obtain a temperature change of wide variations in a chamber in which the room temperature is not controlled.

Furthermore, it is necessary to constantly monitor the temperature of the housing and to turn on and off the cooler or the heater, open or close the doors and carry out the cages by hand, as occasion demands. For this reason, the conventional apparatus is inferior in responsiveness, and it is not easy to obtain high reproducibility and, hence, data having high reliability from such apparatus.

Accordingly, it is an object of the present invention to provide an animal experiment apparatus which is capable of imposing the same environmental conditions on small animals.

It is another object of the present invention to provide an animal experiment apparatus which is capable of experiments of imposing stress on small animals under the temperature conditions of wide variations, which is excellent in workability and which easily provides data having high reliability.

SUMMARY OF THE INVENTION

To achieve this aim, in one aspect of the present invention, there is provided an animal experiment apparatus comprising:

a housing;

partition shelves for vertically dividing the housing into a plurality of chambers and placing cages containing small animals thereon;

a heater and a cooler provided in the housing;

a commutator plate for controlling the direction of flow of the heated air or the cooled air blown from the heater or the cooler; and a brightness-controllable lighting fixture provided in each chamber.

In another aspect of the present invention, there is provided an animal experiment apparatus comprising:

a housing;

partition shelves for vertically dividing the housing into a plurality of chambers and placing cages containing small animals thereon;

a heater and a cooler provided in the housing;

a commutator for controlling the direction of flow of the heated air or the cooled air blown from the heater or the cooler;

a brightnes-controllable lighting fixture provided in the housing;

a moistening device for moistening the interior of the housing;

a temperature sensor for detecting the temperature of the housing and a humidity sensor for detecting the humidity of the housing;

a control unit which compares the detection signals from the temperature sensor and the humidity sensor with the respective set values and so controls the heater, the cooler and the moistening device that the detected values are in the range of the respective set values;

a value setting device for setting the respective values in the control unit; and a recorder for recording the detection signals output from the temperature sensor and the humidity sensor.

In an animal experiment apparatus according to the present invention, since a lighting fixture is provided in each chamber, the brightness is substantially the same in the cage containing a small animal no matter which chamber it is laid in.

Since the commutator plate controls the flow of the air blown from the air fan, it is possible to make the flow rate and the airflow of the air blown to the cages substantially uniform.

The temperature of the housing accommodating the cages which contain small animals is controlled by the heater or the cooler and the humidity thereof is controlled by the moistening device. The operations of these devices are controlled by the control unit. The temperature and the humidity of the housing are constantly detected by the temperature sensor and the humidity sensor and the detected values are output to the control unit. The control unit compares the detected values with the set values and so controls the heater, the cooler and the moistening device that the detected values of the temperature and the humidity are in the range of the set values. The set values in the control unit are set by the value setting device, and the temperature and the humidity of the housing are constantly recorded by the recorder which supplies the output signals from the temperature sensor and the humidity sensor.

Since the lighting fixture is brightness-controllable, it is possible to so control the intensity of the light cast on each cage as to be constant irrespective of the location and the number of the cages.

As described above, according to the animal experiment apparatus of the present invention, it is possible to make the environmental conditions for small animals substantially uniform to such an extent that the brightnesses, the flow rates and the air flow with respect to the cages containing small animals become substantially uniform. Since the temperature of the housing accommodating the cages which contain small animals is controlled not manually but automatically, the workability is improved.

Since the temperature of the housing is constantly detected and input to the control unit and the signals are constantly supplied from the control unit to the heater and the cooler, even if the measured value deviates from the set value, the temperature of the housing is adjusted to the range of the set value with good responsiveness. Thus, it is easy to obtain data having good reproducibility and high reliability.

Since it is possible to control the humidity simultaneously with the temperature, a rich variety of experiments are enabled.

In addition, since the temperature sensor and the humidity sensor constantly output detection signals to the recorder, the management of the records of experimental data is ensured.

BRIEF DESCRIPTION OF THE DRAWINGS

The drawings show embodiments of the present invention, wherein FIGS. 1 to 3 show a first embodiment of the present invention, FIG. 4 a second embodiment and FIGS. 5 to 8 a third embodiment.

The same reference numerals are provided for the elements which are common to all the embodiments.

DETAILED DESCRIPTION OF THE PREFERRED EMBODIMENT

A first embodiment of the present invention will be explained with reference to FIGS. 1 to 3.

Figure 1:
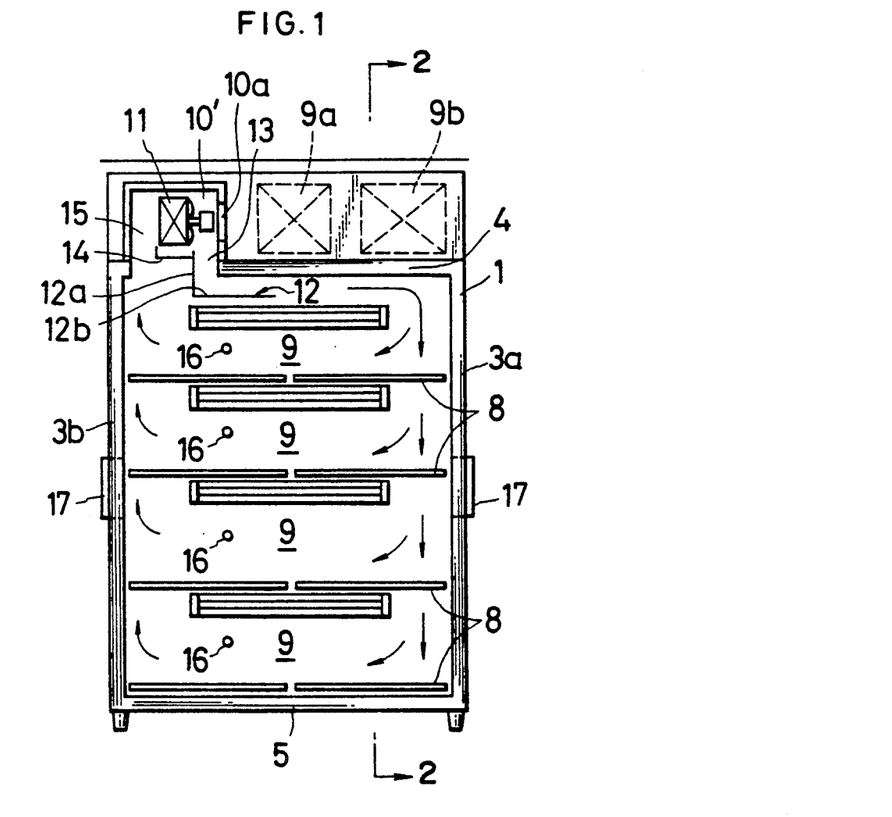
FIG. 1 is a schematic elevational view of the inner structure of an embodiment of the present invention.
Figure 2:
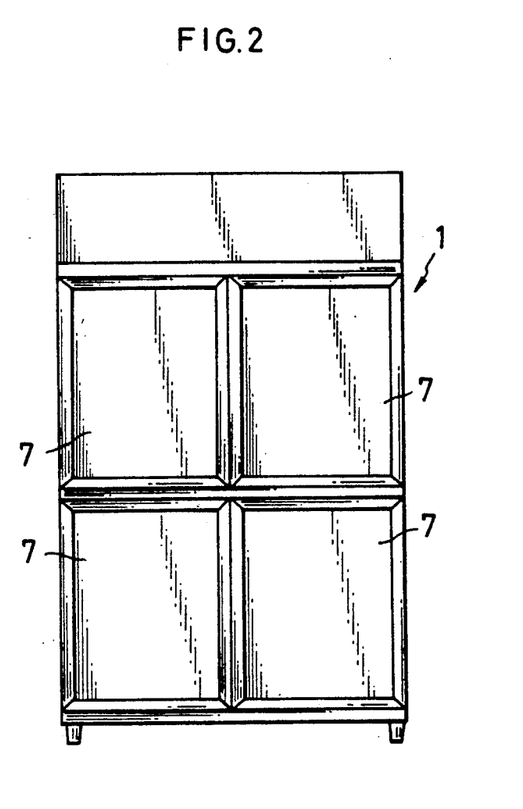
FIG. 2 is an elevational view of the embodiment shown in FIG. 1.
Figure 3:
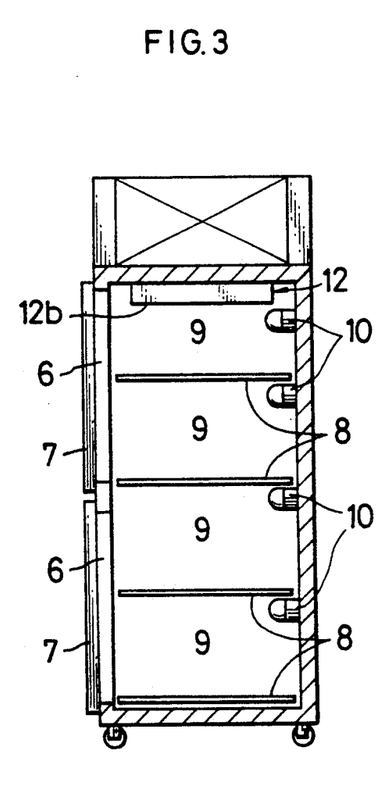
FIG. 3 is a schematic sectional view of the inner structure of the embodiment shown in FIG. 1, taken along the line 2—2.

In FIGS. 1 to 3, the reference numeral 1 represents a housing, which consists of a rear wall portion 2, side wall portions 3a, 3b, an upper wall portion 4 and a bottom wall portion 5. A plurality of glass doors 7 are provided on the opening portion 6 at the front surface of the housing 1 in such a manner as to be freely opened and closed. Each door 7 is made of air-gap glazing and is provided with a heater for preventing the door from being clouded up with condensation. The interior of the housing 1 is vertically divided into a plurality of chambers 9 by net partition shelves 8. A lighting fixture 10 having a brightness-controlling device which is capable of controlling the illuminance is provided on the rear wall in the upper portion of each chamber 9.

The upper space in the housing 1 is provided with a heater 9a or a cooler 9b, and an air fan chamber 10' accommodating an air fan 11 is provided at one end portion of the upper space. Heated air or cooled air is supplied into the air fan chamber 10' from the heater 9a or the cooler 9b through a supply means (not shown) and blown upward and downward by the air fan 11. Below the air fan 11 a commutator plate in the shape of a conduit is provided in order to change the direction of the air flow blown from the air fan 11. The commutator plate 12 is composed of a perpendicular portion 12a and a horizontal portion 12b. The perpendicular portion 12a is disposed in parallel to one side surface 10a of the air fan chamber 10, namely, the surface to which air is blown, while the horizontal portion 12b is disposed in parallel to the ceiling of the housing 1. The gap between the perpendicular portion 12a and the side surface 10a of the air fan chamber 10' constitutes a blowoff 13 for hot air or cold air. The reference numeral 14 represents an air fan cover which is protruded from the perpendicular portion 12a of the commutator plate 12 in the parallel and opposite direction to the horizontal portion 12b. The gap between the end portion of the air fan cover 14 and the other side surface 10b of the air fan chamber 10' constitutes an air inlet 15. The reference numeral 16 denotes a temperature sensor which is provided in each chamber 9. The temperature sensor 16 is made movable so as to measure the temperature at a given portion of each chamber 9. A ventilation portion 17 for taking fresh air into the housing 1 is composed of vents provided on the side wall portions 3 of the housing 1 and doors for opening or closing the vents.

As the partition shelf 8, copper wires coated with a resin is used. The housing 1 is made of inner and outer stainless steel plates and an insulating material of rigid foamed polyurethane inserted between the steel plates.

It is also possible that the heater 9a or the cooler 9b is disposed outside of the housing 1 and connected to the air fan chamber 10' by a duct or the like.

The operation of the apparatus having the above-described structure will now be explained. When the heater 9a or the cooler 9b and the air fan 11 are operated while the cages contain small animals placed on the partition shelves, the cooled air or the heated air passes the gap between the inner wall of the housing 1 and the commutator plate 12 through the blowoff 13. When the cooled air or the heated air hits against the one side wall 3a, it flows downward along the side wall 3a. During this time, a part of the air flows into each chamber 9, as indicated by the arrows, advances towards the other side wall portion 3b, and when it hits against the side wall portion 3b, it flows upward along the side wall portion 3b and into the air inlet side of the air fan 11. In this way, the hot or cold air blown out of the air fan 11 is divided into a component which flows along the upper wall portion 4, the side wall portion 3a, the bottom wall portion 5 and the side wall portion 3b, and a component which flows through each chamber 9, whereby the temperature of each chamber 9 is raised or lowered to substantially the same temperature.

When the temperature sensor 16 detects that the temperature of the housing 1 comes to the set temperature, the thermostat works so as to stop the operation of the heater 9a or the cooler 9b, and when the temperature rises or drops to such an extent as to cause a deviation from the set temperature, the heater 9a or the cooler 9b starts to operate again.

Figure 4:
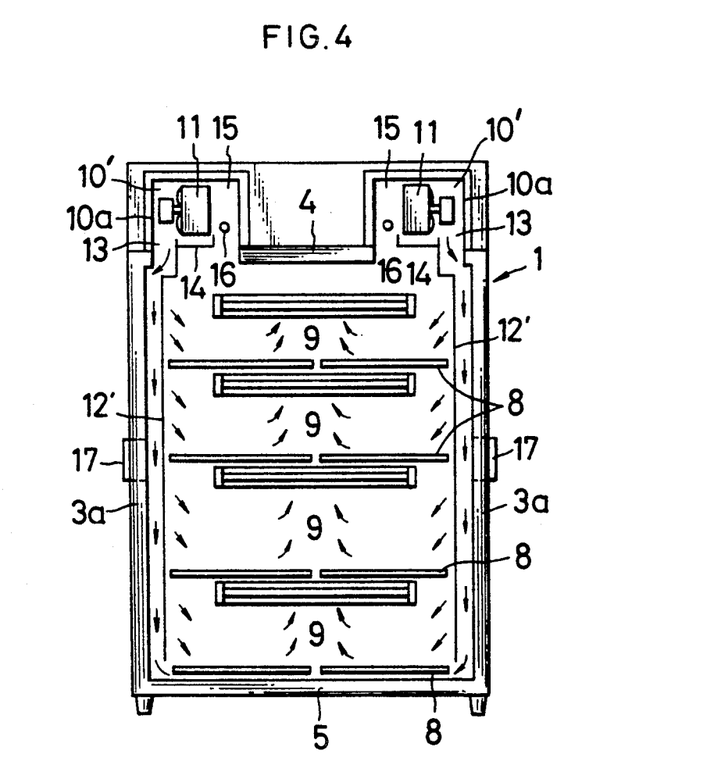
FIG. 4 is a schematic elevational view of the inner structure of another embodiment of the present invention.

In a second embodiment shown in FIG. 4, the commutator plate 12 is replaced by commutator plates 12' which are disposed in parallel to the side wall portions 3a, 3b substantially over the entire surfaces.

In this embodiment, the air fan 11 is provided in each of the air fan chambers 10 which are provided at the upper portion in the housing 1 so as to protrude from the upper ends of the side wall portions 3a, 3b.

The temperature sensor 16 is provided at the air inlet 15 of each air fan 11.

The commutator plate 12' is made of a wire net, a steel plate provided with holes or the like.

The flow of the air in the apparatus having the above-described structure is indicated by the arrows in the same way as in the first embodiment. The air which is blown through the blowoff 13 of the air fan 11 is caused to flow downward parallel to the side wall portions 3a, 3b of the housing 1 by the commutator plates 12', while a part of the air passes through the commutator plates 12' and flows into each chamber 9 with uniform flow rate and airflow. The air which has passed through each chamber 9 rises and flows upward to the air inlets 15. Accordingly, the animals placed in all the chambers 9 are subjected to the uniform temperature environment under substantially the same flow rate and airflow.

In the experiments of imposing stress on small animals, for example, a high-temperature atmosphere and a low-temperature atmosphere are alternately created every hour from 10 a.m. to 5 p.m. The set temperature is different depending upon the test animal, but is generally in the range of −5° to 40° C. For example, the high temperature is set at 24° C., and the low temperature is set at 4° C. for mice, −3° C. for rats and 0° C. for guinea pigs. It is also possible to vary the illuminance as well as the set temperatures. The illuminance is generally set in the range of 0 to 10,000 luxes.

A third embodiment of the present invention will be explained with reference to FIGS. 5 and 6.

Figure 5:
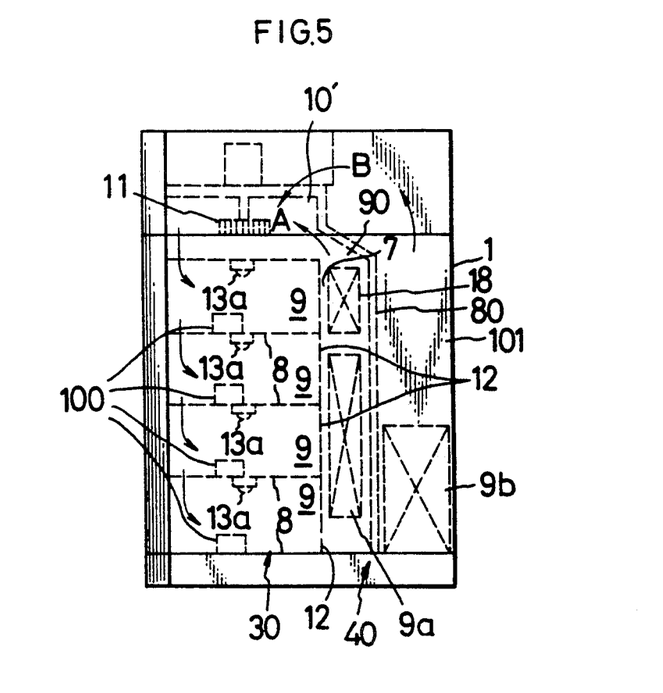
FIG. 5 is a schematic elevational view of the inner structure of still another embodiment of the present invention.
Figure 6:
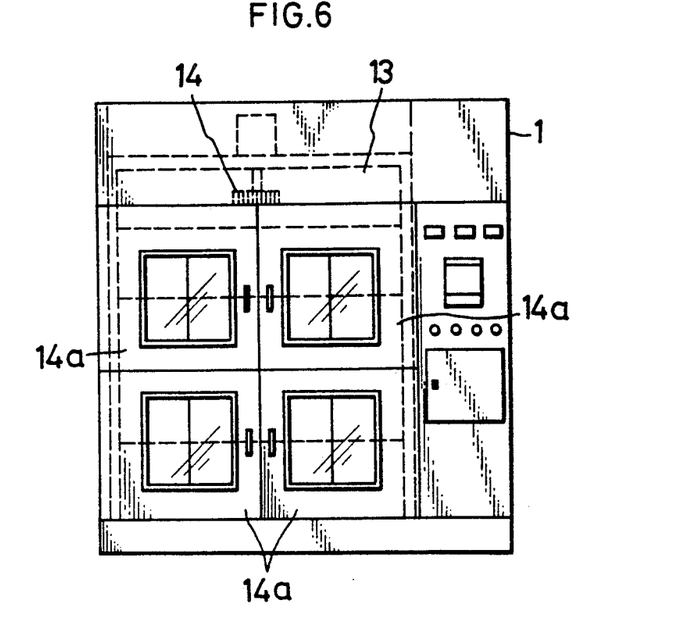
FIG. 6 is an elevational view of the embodiment shown in FIG. 5.

FIGS. 5 and 6 show the housing accommodating cages 100 which contain small animals. The interior of the housing 1 is horizontally divided into a cage accommodating space 30 and an installation space 40. The cage accommodating space 30 is vertically divided into a plurality of chambers 9 by the partition shelves 8. The cage accommodating space 30 and the installation space 40 are partitioned by the commutator plate 12 which serves as the rear wall of each chamber 9 at the right-hand side of the drawing and which regulates the flow of air.

The installation space 40 is horizontally divided into a heating chamber 90 and a cooling chamber 101 by a partition wall 80. In the heating chamber 90, the heater 9a is provided, while the cooler 9b is provided in the cooling chamber 101.

In the upper portion of the housing 1, the air fan chamber 10' is provided and the air fan 11 is provided therein. When the air fan 11 is rotated, the air A in the heating chamber 90 rises in the heating chamber 90, flows into the air fan chamber 10', flows downward therefrom, and flows into the front side of each chamber 9. The air which has passed through each chamber 9 in the horizontal direction flows into the heating chamber 90 through the commutator plate 12. On the other hand, the air B in the cooling chamber 101 passes over the partition wall 80 and reaches the air fan chamber 10'. The air B then flows downward, passes through each chamber in the horizontal direction and flows into the heating chamber 90 through the commutator plate 12.

The air A, B circulates through the above-described routes so as to heat or cool the housing 1. The reference numeral 13a represents a brightness-controllable lighting fixture installed in the upper portion of each chamber 9, and 14a a door for opening or closing the front surface of each chamber of the housing 1.

Figure 7:
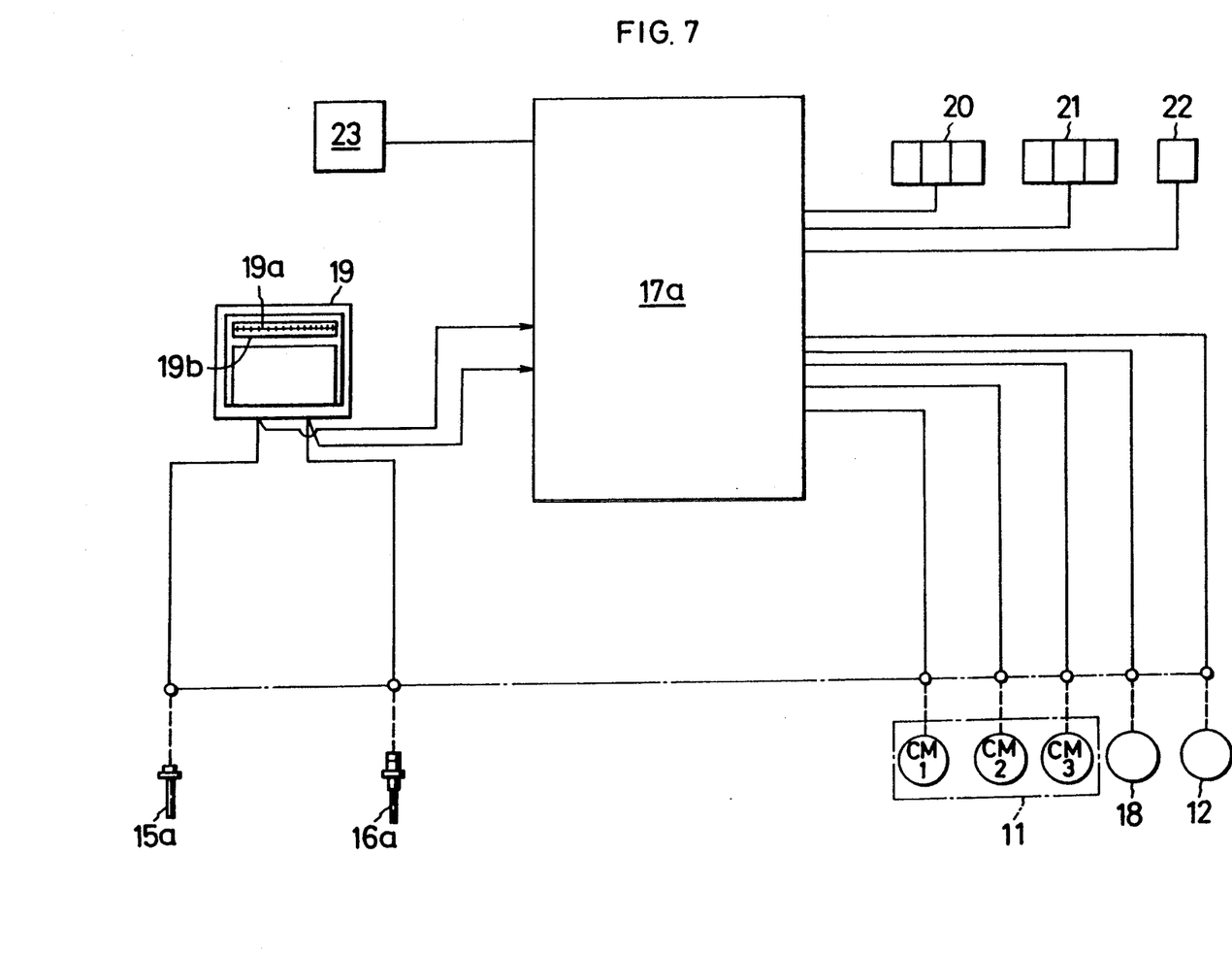
FIG. 7 is a schematic view of the control unit for controlling the temperature and the humidity of the housing in the embodiment shown in FIG. 5.

FIG. 7 schematically shows the control unit for controlling the temperature and the humidity of the housing 1. The reference numeral 15a represents a temperature sensor, 16a a humidity sensor, both of which are disposed in the housing 1. The detection signal from the sensors 15a and 16a are input to a control unit 17a.

The control unit 17a controls the heater 9a, the cooler 9b and a moistening device 18 so that the temperature and the humidity of the housing 1 are maintained in the set range. It is possible to set, for example, the lower limit of the temperature, the upper limit of the temperature, the operation time at the lower limit of the temperature and the operation time at the upper limit of the temperature in the control unit 17a.

The reference numeral 19 represents a recorder for recording the temperature and the humidity of the housing 1 output from the temperature sensor 15a and the humidity sensor 16a. The recorder 19 is connected in series between the temperature and humidity sensors 15a and 16a and the control unit 17a. Thus, the detection signals from the sensors 15a and 16a are input to the control unit 17a through the recorder 19.

The recordr 19 is not specified, but a typical example is composed of a pen body 19a which is displaced in accordance with the voltage outputs from the temperature sensor 15a and the humidity sensor 16a and rolled paper 19b wound over a feed roll and a take up roll, so that the displacement of the pen body 19a is recorded on the rolled paper 19b.

The reference numerals 20 and 21 denote the temperature displays for displaying the upper limit and the lower limit of the set temperatures, respectively, 22 a pattern display for displaying a temperature-change pattern, 23 a value setting device for setting the upper limit and the lower limit of the temperatures and the operation times at the respective temperatures in the control unit 17a.

Figure 8A:
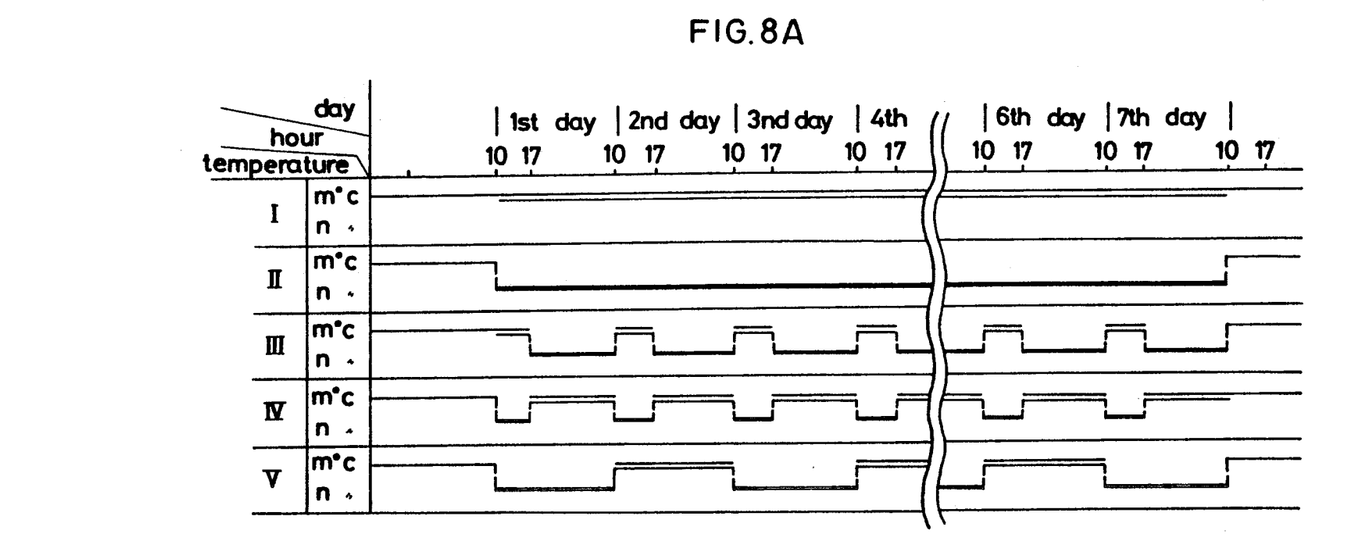
FIGS. 8A and 8B are explanatory views of the temperature-change pattern of the housing in the embodiment shown in FIG. 5.
Figure 8B:
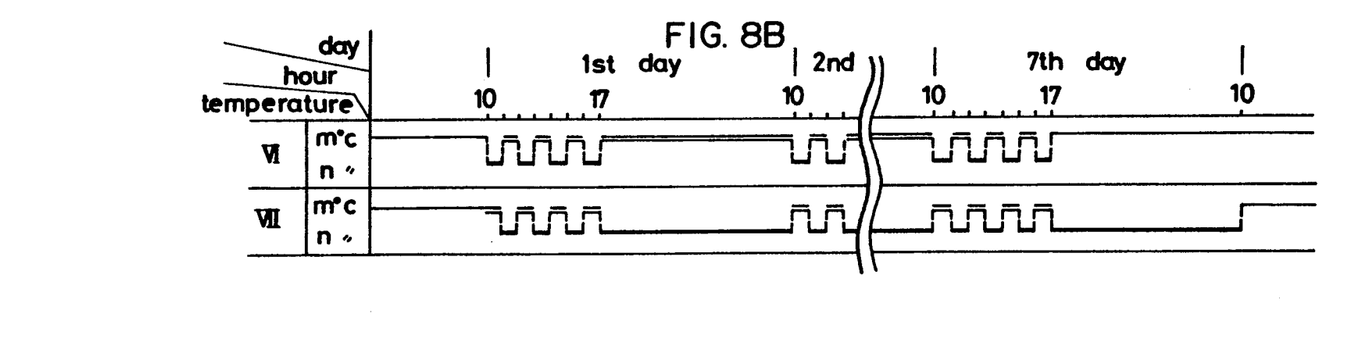

The operation of the apparatus having the above-described structure will now be explained. It is necessary to set the conditions for imposing a stress on small animals such as mice by subjecting them to an environmental change. These conditions are set by the value setting device 23. The temperature conditions to be set have various patterns, as shown in FIGS. 8A and 8B. In FIGS. 8A and 8B, the symbols I to VII represent the following patterns:

I: constantly m° C.
II: constantly n° C.
III: m° C. from 10 a.m. to 5 p.m., and n° C. from 5 p.m. to 10 a.m. on the next day
IV: n° C. from 10 a.m. to 5 p.m., and m° C. from 5 p.m. to 10 a.m. on the next day
V: n° C. and m° C. alternating every day
VI: n° C. and m° C. alternating every hour from 10 a.m. to 5 p.m., and m° C. from 5 p.m. to 10 a.m. on the next day
VII: m° C. and n° C. alternating every hour from 10 a.m. to 5 p.m., and n° C. from 5 p.m. to 10 a.m. on the next day.

In the case of I, the upper and the lower limits of the temperature are set at m° C. and the operation time is set at the sum of required days.

In the case of II, the upper and the lower limits of the temperature are set at n° C. and the operation time is set at the sum of required days.

In the case of III, the upper limit is set at m° C. and the lower limit at n° C. The period from 10 a.m. to 5 p.m. is the operation time at m° and the period from 5 p.m. to 10 a.m. on the next day is the operation time at n° C.

In the case of IV, the upper limit is set at m° C. and the lower limit at n° C. The period from 10 a.m. to 5 p.m. is the operation time at n° C. and the period from 5 p.m. to 10 a.m. on the next day is the operation time at m° C.

In the case of V, the upper limit is set at m° C. and the lower limit at n° C. The operation time at n° C. and the operation time at m° C. are alternated every day.

In the case of VI, the upper limit is set at m° C. and the lower limit at n° C. The operation time at n° C. and the operation time at m° C. are alternated every hour from 10 a.m. to 5 p.m., and the period from 5 p.m. to 10 a.m. on the next day is the operation time at m° C.

In the case of VII, the upper limit is set at m° C. and the lower limit at n° C. The operation time at m° C. and the operation time at n° C. are alternated every hour from 10 a.m. to 5 p.m., and the period from 5 p.m. to 10 a.m. on the next day is the operation time at n° C.

When an operation switch (not shown) is turned on after the upper and lower limits of temperature and the operation times at the upper and lower limits are set as described above, the heater 9a or the cooler 9b is operated. Which of the heater 9a or the cooler 9b is operated is determined by the result of the comparison of the measured value detected by the temperature sensor 15a with the upper limit and the lower limit. This comparison is carried out in the control unit 17a and when it is necessary to raise the temperature of the housing 1 as a result of the comparison, the heater 9a is operated, while the cooler 9b is operated when it is necessary to lower the temperature of the housing 1. If the heater 9a has a plurality of compressors CM1, CM2 and CM3, the control unit 17a supplies a signal to each of the compressors CM1, CM2 and CM3.

The temperature of the housing 1 is automatically so controlled in the above-described way as to be maintained at $-5°$ C. to $40°$ C. or to vary in a given pattern. In either case, it is required that the humidity is constant. The control unit 17a constantly compares the measured value output from the humidity sensor 16a with the set value, and when the measured value deviates from the set range, the control unit 17a outputs a signal to the moistening device 18 and adjusts the amount of steam so that the humidity of the housing 1 is in a constant range.

The illuminance of the lighting fixture 10 is controlled in the range of 0 to 100%, for example, by using a differential transformer so as to be set at 0 to 10,000 luxes. It is preferable that the lighting fixture 10 is appropriately selected so that the light intensity is not reduced at a temperature of $2°$ to $3°$ C. below zero.

What is claimed is:

1. An animal experiment apparatus comprising:
   a housing;
   partition shelves for vertically dividing said housing into a plurality of chambers;
   means for changing temperature provided in said housing;
   at least one air fan provided in an air fan chamber located in said housing;
   a blowoff through which air treated by said means for changing temperature introduced into said air fan chamber is blown by said air fan;
   a commutator plate extending along the inside wall of the housing to control the direction of the blown air for preventing the blown air from being blown on the shelves directly; and
   means for manually setting predetermined temperature condition timing patterns, by which at least upper and lower temperature limits and temperature condition timing patterns can be manually set.

2. The animal experiment apparatus of claim 1, wherein said commutator plate is a duct provided along the side wall of the housing and being provided with a perforation on the wall of the duct adjacent to each chamber such that the blown-in air is in a homogeneous condition.

3. The animal experiment apparatus of claim 1, wherein said means for changing temperature is comprised of at least one of a heater and a cooler.

4. The animal experiment apparatus of claim 1, further comprising moistening means for moistening the interior of said housing.

5. The animal experiment apparatus of claim 4, further comprising at least one humidity sensor for detecting the humidity in said housing.

6. The animal experiment apparatus of claim 5, further comprising means for manually controlling humidity, by which at least one of an upper humidity limit, a lower humidity limit and humidity condition timing patterns can be manually set.

7. The animal experiment apparatus of claim 1, further comprising a lighting fixture in said housing.

8. An animal experiment apparatus comprising:
   a housing;

partition shelves for vertically dividing said housing into a plurality of chambers;

means for changing temperature provided in said housing;

at least one air fan provided in an air fan chamber located in said housing;

a blowoff through which air treated by said means for changing temperature introduced into said air fan chamber is blown by said air fan;

a commutator plate extending along the inside wall of the housing to control the direction of the blown air for preventing the blown air from being blown on the shelf directly;

at least one temperature sensor for detecting the temperature in said housing;

means for automatically setting temperature condition timing patterns, which means compares detected signals from said at least one temperature sensor with predetermined upper and lower temperature values, and controls said means for changing temperature so that said detected values are alternately maintained at substantially said upper and lower predetermined values; and recorder means for recording said detected signals output from said temperature sensor.

9. The animal experiment apparatus of claim 8, further comprising a moistening device for moistening the interior of said housing.

10. The animal experiment apparatus of claim 9, further comprising at least one humidity sensor for detecting the humidity in said housing.

11. The animal experiment apparatus of claim 10, further comprising means for automatically controlling humidity, by which at least one of an upper humidity limit, a lower humidity limit and humidity condition timing patterns are automatically controlled, which means compares detected signals from said at least one humidity sensor with at least one predetermined humidity value.

* * * * *